United States Patent Office 3,520,387
Patented July 14, 1970

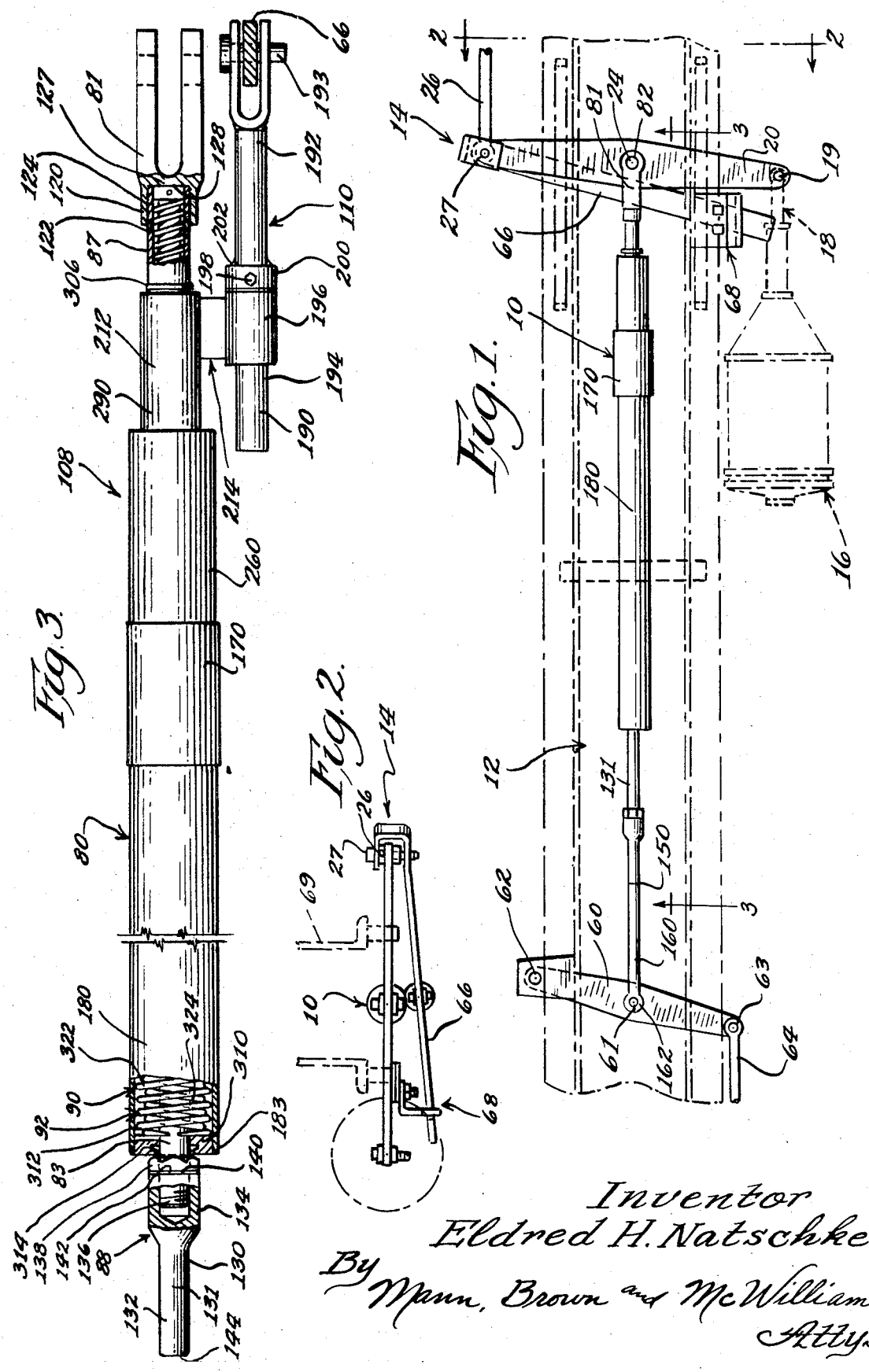

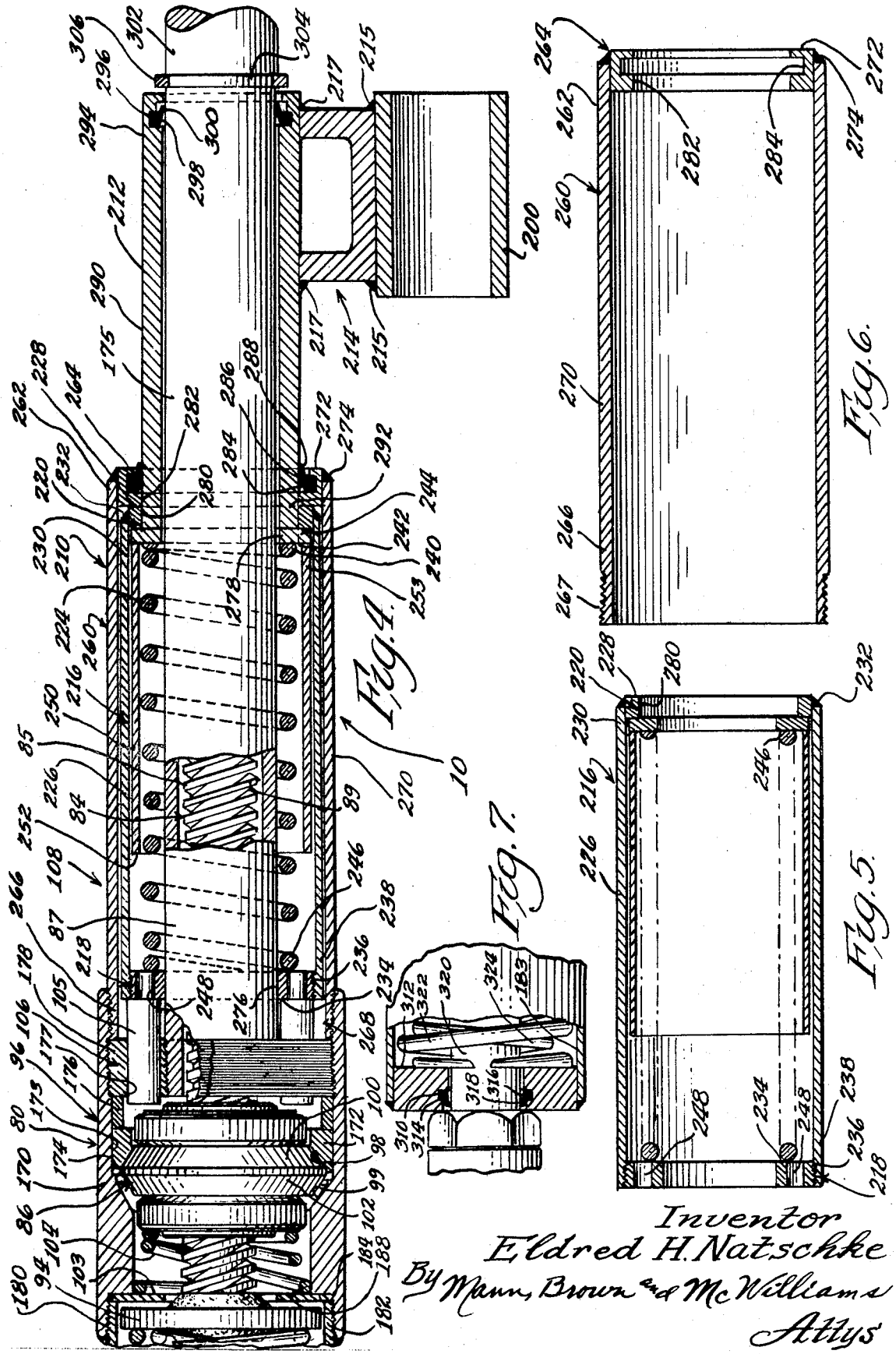

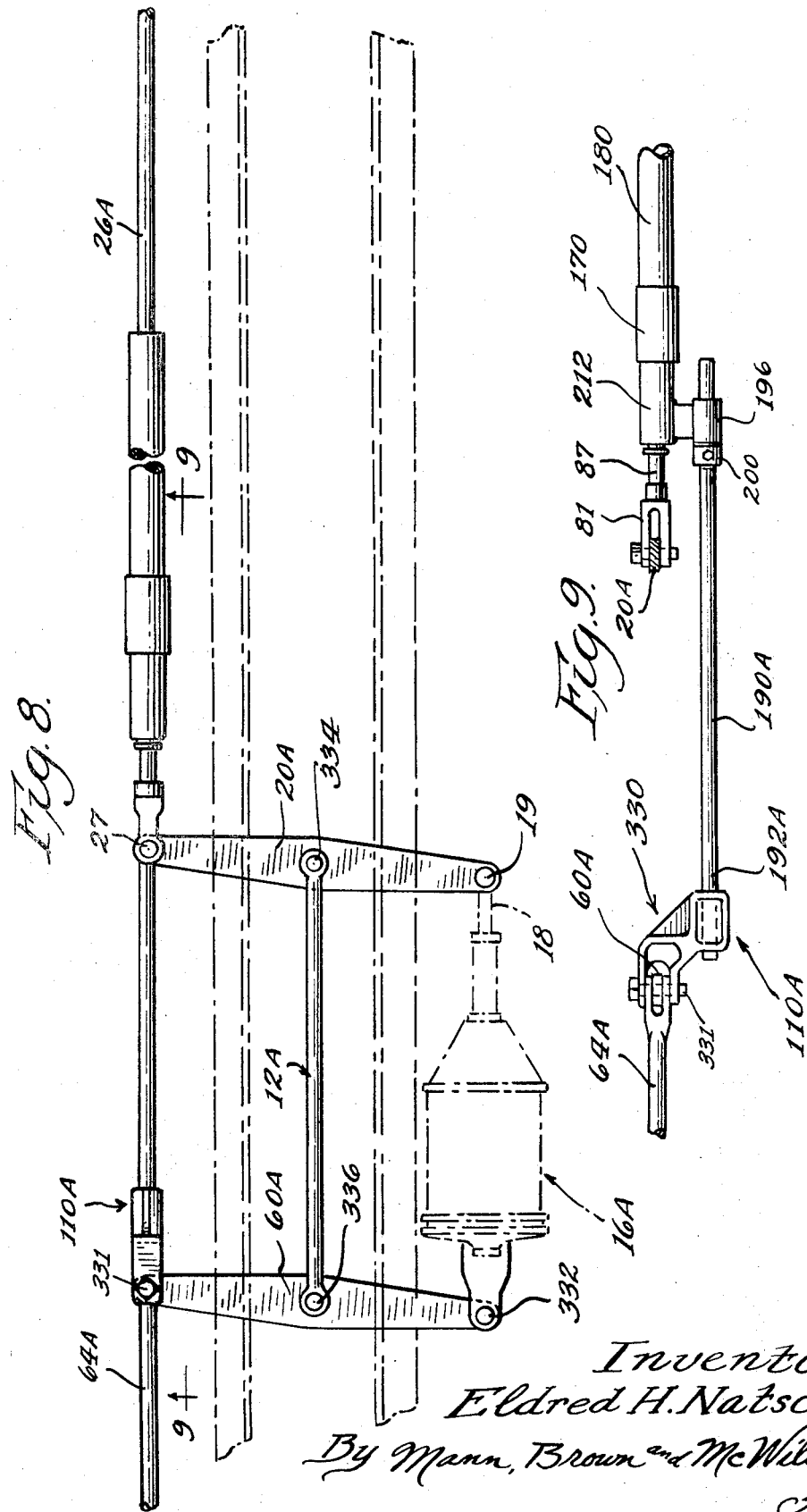

3,520,387
TWO-WAY AUTOMATIC BRAKE ADJUSTER
Eldred H. Natschke, Bourbonnias, Ill., assignor to Universal Railway Devices Company, a corporation of Illinois
Filed June 24, 1968, Ser. No. 739,439
Int. Cl. F16d 65/66
U.S. Cl. 188—202                13 Claims

ABSTRACT OF THE DISCLOSURE

The disclosure relates to a two-way automatic brake adjuster for use in railroad car brake rigging and is an improvement over that disclosed in Rauglas Pat. 3,177,985. In accordance with the improvements of this application the overtravel spring device that forms the resiliently flexible thrust device of the slack take up control arrangement of the adjuster of said Rauglas patent is in the form of a dual cannister arrangement that provides for full enclosure of the compression spring and nut thrust pins involved, with the adjuster operating parts being sealed against the elements for maximum operating efficiency. The adjuster is arranged to provide 19 inches of travel within a maximum extended length limitation of 84¼ inches for center rod applications, and is provided with arrangements at either end thereof for connecting the adjuster into the brake rigging that adapts the adjuster for ready application to various car builder car designs.

---

The principal commercial form of the adjuster disclosed in Rauglas Pat. 3,177,985 has been designed to provide 17 inches of travel between maximum slack let out and take up positions within a maximum extended length of 85 inches between the housing member clevis and the extreme end of the welding stud of the screw rod extension fitting. While some additional travel has been found to be desirable, the achieving of added travel by merely making the adjuster relevant parts longer results in the maximum extended distance of the adjuster being increased about three inches for each additional inch of travel built into the adjuster (assuming the special tubular screw rod arrangement of Patent No. 3,404,759, and owned by the assignee of the instant application, is not employed), in addition to which the customary 4 inch welding stud at the end of the screw rod extension fitting must be added. Thus, the addition of 2 inches travel to the 17 inch travel unit would make it 95 inches in extended length which would violate AAR regulations for center rod applications.

A principal object of this invention is to provide a 19 inch travel adjuster of the type indicated while keeping the maximum extended length to no more than about 90 inches and retaining the basic essentials of the adjuster of the above patent.

Another principal object of the invention is to provide an arrangement for connecting the adjuster screw rod into the rigging that accommodates the various connection arrangements used by car builders and makes the adjuster interchangeable with other commercial adjusters.

Other objects of the invention are to simplify the basic adjuster of the above patent while at the same time achieve maximum travel within the indicated 90 inches maximum length dimension, to better protect the operating parts of the adjuster against the adverse effects of extreme weather conditions, and to provide an adjuster which is economical of manufacture, convenient to install, and long lived in use.

Still other objects, uses, and advantages will be obvious or become apparent from a consideration of the following detailed description and the application drawings in which like reference numerals are employed to designate like parts throughout the several views.

In the drawings:
FIG. 1 is a diagrammatic plan view illustrating a typical center rod type application to which the adjuster of this invention has been applied;
FIG. 2 is a diagrammatic cross-sectional view taken substantially along line 2—2 of FIG. 1;
FIG. 3 is an elevational view of the adjuster, on an enlarged scale and with parts broken away to facilitate illustration, showing the adjuster in its contracted or full slack take up position;
FIG. 4 is a fragmental sectional view taken approximately along line 3—3 of FIG. 1, but on an enlarged scale and illustrating the improvements in the overtravel device associated therewith for effecting slack take up movement of the spin nut;
FIGS. 5 and 6 are sectional views of two of the principal components of the overtravel device;
FIG. 7 is a fragmental sectional view on an enlarged scale of the left hand end of the adjuster housing member as shown in FIG. 3;
FIG. 8 is a view similar to that of FIG. 1, but showing the adjuster in top rod application; and
FIG. 9 is a view substantially along line 9—9 of FIG. 8.

However, it is to be understood that the specific drawing illustrations provided are supplied primarily to comply with the requirements of the Patent Code and that the invention is susceptible of other embodiments that are intended to be covered by the appended claims.

Referring first to FIGS. 1 and 2, reference numeral 10 generally indicates a diagrammatically illustrated embodiment of this invention incorporated in the center rod structure 12 of a conventional brake rigging arrangement generally indicated by reference numeral 14, which may be of the type more fully illustrated and described in said Rauglas patent (the entire disclosure of which is incorporated herein by this reference). Reference may be had to said Rauglas patent for a specific description of brake rigging 14 and it suffices for present purposes to point out that brake rigging 14 customarily includes an air actuated brake cylinder 16 that is secured to the car in any suitable manner and includes a thrust or piston rod 18 that is pivotally connected as at 19 to cylinder lever 20 which is in turn pivotally connected to the center rod structure 12 as at 24 and a connecting rod 26 as at 27 that extends to one of the car trucks.

The center rod structure 12 is also pivotally connected as at 61 to dead lever 60 which is fulcrumed in any suitable manner to the car structure as at 62 and which is pivotally connected as at 63 to connecting rod 64 that extends to the other car truck. Connecting rods 26 and 64 are connected to the truck brake apparatus of the respective trucks in any conventional manner, such as that shown in the Rauglas patent.

As is disclosed in said Rauglas patent, when braking of the car is to be effected, the brake cylinder 16 is actuated to move its thrust or piston rod 18 to the right of FIG. 1, which tends to throw the cylinder lever 20 counterclockwise about the pivotal connection 24 with the center rod structure, and tends to move the connecting rod 26 to the left to operate the truck brake apparatus that rod 26 is connected to. Similarly, dead lever 60 swings counterclockwise about its pivotal connection 62 to draw connecting rod 64 to the right of FIG. 1 to operate the truck brake apparatus that it is connected to. The brakes are in effect released when air is released from the cylinder 16 (in a conventional manner) due to the fact that the weight of the truck brake beams tends to swing them away from the respective truck wheels about the respective brake beam pivotal hanger mountings, which causes the connecting rods 26 and 64, cylinder lever 20, dead lever 60 and the thrust or piston rod to move in the opposite directions and back to their running positions.

During this functioning of the adjuster 10, the adjuster operates under the control of operating or trigger lever 66 that is connected between the cylinder lever 20 at pivotal connection 27, and a bracket structure 68, in the manner disclosed in said Rauglas patent, to control the slack let out and take up functions of adjuster 10. As disclosed in said Rauglas patent, the general function served by adjuster 10 is to consistently maintain the stroke of the brake cylinder at a predetermined length (7 inches in accordance with AAR regulations) and to automatically accommodate or effect the brake rigging slack take up and let out that is involved in providing such results.

In the forms illustrated, the cylinder lever 20, dead lever 60, and trigger lever 66 are supported from the car center sill 69 through the diagrammatically illustrated support brackets.

The adjuster 10 generally comprises an elongated housing member 80 pivotally connected to the cylinder or live lever by a suitable pin 82 (which forms the pivotal connection 24) applied between the cylinder lever 20 and a clevis 81 that is secured to housing member 80.

The housing member 80 receives screw rod member 84 that has one end 85 thereof suitably screw threaded for cooperation with a spin nut 86 that functions in accordance with the teachings of said Rauglas patent to provide for slack take up and let out. Rod member 84 at its other end 83 is adapted in accordance with the teachings of this invention for connection to dead lever 60 through a special fitting structure 88.

The housing member 80 includes a tubular extension portion 87 defining a bore 89 which receives the screw threaded end 85 of rod member 84 as the adjuster operates to take up slack. Housing 80 also defines a spring chamber 90 in which is received about the rod member 84 a helical spring unit 92 that acts, between housing 80 and a spring seat 94 fixed to rod member 84, in a manner to draw the rod member 84 inside the housing member 80 in a slack take up direction.

The housing member 80 includes a friction stop clutch assembly generally indicated at 96 that includes annular friction clutch or stop seats 98 and 99 that are disposed on either side of the spin nut 86 for cooperation with corresponding clutch surfaces 100 and 102 of the spin nut in the manner described in said Rauglas patent.

Associated with the spin nut 86 on one side thereof is a slack pay out or let out spring 104 seated against spring seat 103 and on the other side thereof the nut is engaged by a plurality of thrust pin members 105 slidably mounted in the end wall structure 106 of housing 80 and engaged by the overtravel resiliently flexible thrust device 108 that forms a part of the slack take up and let out trigger mechanism or control assembly 110 which is associated with adjuster 10 for purposes of controlling the slack take up and let out functions of the adjuster.

As illustrated, the tubular portion 87 of housing 80 is attached to clevis 81 by having the stud portion 120 of the clevis bored as at 122 and internally threaded to cooperate with threading 124 on the external surface 126 of tubular portion 87 so that the terminal end surface 127 of screw rod end 85 may advance into clevis stud portion 120 in moving to its position of maximum contraction or slack take up, in which position surface 127 abuts the clevis stop surface 128. This arrangement permits a travel extension of up to an inch and a quarter over the corresponding arrangement shown in the Rauglas patent.

Further in accordance with this invention, the fitting structure 88 is provided for the end 83 of rod member 84, which comprises a fitting member 130 comprising a rod element 131 including a shank 132 and in internally threaded end portion 134 that threadedly receives the end 83 of rod member 84, which is externally threaded as at 136 for this purpose as well as for receiving hex nut 138 that is turned up against lock washer 140 and terminal end portion 142 of shank 132 for this purpose.

The fitting member 130 adapts adjuster 10 for application to existing car builders brake rigging arrangements of the center rod application type and espectially for connection to the dead lever thereof. Thus, for these applications the dead lever 60 is provided with a rod component 160 (which includes eye 162 that is to be pivoted to dead lever 60 by pin 61), which is welded as at 150 to end 144 of fitting member 130. Thus, the shank portion 132 of member 130 serves as the welding stud for that element, and by loosening nut 138 and turning member 130 with respect to rod member 84, the exact fit desired with respect to element 160 may be obtained, after which the nut 138 is tightened to lock member 130 in place with respect to the rod member 84.

Referring to FIG. 4, the stop nut clutch assembly 96 is arranged to make sleeve member 170 a one element member formed by a suitable machine operation to define clutch seat 99. Clutch seat 98 is formed on a separate hardened ring 172 that is held in place against a shoulder 174 formed in sleeve 170 by end wall structure 106 being turned against retainer sleeve 176 within the counterbore 173 of sleeve 170 that defines shoulder 174. In the form shown, the extension portion 87 and wall structure 106 of housing member 80 are defined by a one piece tubular element 175 threadedly carrying a ring member 178 to define the wall structure 106. Ring member 178 is bored as at 177 to receive the respective thrust pins 105 in spaced apart relation thereabout.

Spring chamber 90 is defined by a separate tubular member 180 having its end 182 threadedly engaged within a counter bore 184 of sleeve 170 and secured in place by welding as at 186 in leakage free relation therebetween. The end 182 of tubular member 180 seats against disc member 188 that forms spring seat 103 for pay out spring 104.

The slack take up and let out control assembly 110 as shown is in the form of a trigger arm or rod 190 having one end 192 thereof suitably connected with operating lever 66, as by pin 193, and the other end 194 slidably received in sleeve 196 that is associated with the adjuster thrust device 108. Secured to arm 190 by bolt 198 is stop sleeve or disc 200 that, on application of the adjuster to the rigging, is positioned so that the adjuster will have the desired stroke with new brake shoes in place. This is done by loosening bolt 198, and after disc 200 is positioned as desired, disc 200 is welded in place, as indicated at 202. Such an arrangement avoids having to adjustably mount bracket 68, which may be fixed in its operating position in any suitable manner.

In accordance with this invention, the overtravel resiliently flexible thrust device 108 comprises a dual cannister assembly 210 operably interposed between the thrust pins 105 and a sleeve member 212 that is shiftably carried by the extension portion 87 of housing member 80 and is made fast to the sleeve 200 of the control assembly 110 by fixing filler 214 therebetween (as by welding at 215 and 217).

The dual cannister assembly 210 comprises a cylinder member 216 defining end walls 218 and 220 between which is interposed compression spring 224. In the form shown, the cylinder 216 comprises a sleeve or shell 226 having ring member 228 welded to its end 230 as at 232 to form the end wall 220, and having ring 234 threadedly received as at 236 in its other end 238 for the purpose of containing spring 224 within same. Spring 224 at its end 240 seats against spring seat 242 defined by disc 244 that in turn seats against the end wall 220 of the cylinder 216 under the compressive strength of spring 224. The other end 246 of spring 224 seats against the ring 234, which may be formed with appropriate diametrically opposed openings 248 for the purposes of applying an appropriate turning tool to same.

Interposed between the sleeve 226 and the spring 224 is a stop sleeve 250 that is provided for the purpose of maintaining the centered location of the spring 224 and to define the limit of contraction of spring 224 by its end 252 contacting the ring 234 when its end 253 is seated against disc 244.

Received about the cylinder 216 is a shell 260 that is flanged at its end 262, as at 264, and is externally threaded at its end 266, as at 267, for application to the internal threading 268 of counterbore 173 of sleeve member 170, whereby shell 266 is made fast to the housing member 80.

Shell 260 comprises a sleeve 270 having ring member 272 fixed thereto, as by welding at 274 to form the flanging 264.

As indicated in FIG. 4, the bores 276 and 278 of the ring 234 and disc 244, respectively, are proportioned to receive extension 87 of housing member 80, while the bore 280 of ring member 228 and the bore 282 of ring member 272 are proportioned to slidably receive the sleeve 212 that is actuated by trigger arm or rod 190.

As is further indicated in FIG. 4, the ring 272 of shell 260 is recessed as at 284 to receive annular seal element 286 formed with an annular flange portion 288 that slidingly receives the external surface 290 of sleeve 212 in sealing relation thereto.

Sleeve 212 has its end 292 received under the seal flange 288 and within the bores 280 and 282 of the rings 228 and 272, respectively, while the other end 294 of same is recessed as at 296 to receive annular seal 298 defining annular flange portion 300 that engages the external surface 302 of housing member extension 87 in sealing relation thereto.

Seals 286 and 298 are preferably formed from a suitable polyurethane material or the like and are provided to exclude dust, dirt and water from entry into the adjuster interior.

Extension 87 of housing member 80 is recessed as at 304 to receive locking ring 306 that serves as a stop for limiting movement of the sleeve 212 to the right of FIG. 4 beyond a predetermined amount.

In assembling the assembly 210, as part of the over-all assembly operation of adjuster 10, with ring 234 dissociated from cylinder 216, the disc 244 is dropped in place against end wall 220 after which spring 224 and sleeve 250 may be inserted followed by the application of disc 234 to the end 238 of cylinder 216 by an appropriate turning operation against the compressive strength of spring 224, which contracts same to the position of FIG. 4. The thus completed cylinder 216 then may be slipped into shell 260 to dispose the end wall 220 of the cylinder 216 against the end wall 264 of shell 260, and assuming that the housing member 80 of the adjuster being assembled is free of its clevis 81, the thus assembled dual cannister unit 210 may be slipped over the extension 87 to apply the end 266 of shell 260 to the threading 268 of sleeve 170 in the manner shown in FIG. 4 (assuming that the parts shown are in shell 170 have already been applied thereto). Sleeve 212 can then be applied to extension 87 of housing member 80 from end 124 of extension 87 and moved beyond recess 304, after which the locking ring 306 may be applied. This will seat the end 292 of sleeve 212 adjacent or against the disc 244 that serves as spring seat 242.

The assembly 210 not only provides an improved embodiment of the resilient thrust device 108, but also provides a desired sealing action between the housing member 80 and the parts that move with respect thereto exteriorally of the wall structure 106. Since a firm seal is provided at the connection between shell 260 and sleeve 170, the parts confined within assembly 210 are thus effectively sealed against the elements.

The housing member 80 at the end 183 of tubular member 180 is also provided with a similar sealing action as indicated in FIGS. 3 and 7, wherein the tubular member 80 at its end 183 is shown fixed to annular member 310 that forms a spring seat 312 for spring unit 92. The ring member 310 is recessed as at 314 to receive a similar seal member 316 that is provided with an annular flange 318 that sealingly engages the external surface 320 of rod member 84.

In the form shown, the spring unit 92 comprises two compression springs 322 and 324 concentrically arranged about rod members 84, with the springs 322 and 324 being of opposite turn, as illustrated.

As the connection of the tubular member 180 to sleeve 170 at the end 182 thereof is leak-free, it will thus be seen that the operating parts of the adjuster within sleeve 170 and tubular member 180 are likewise sealed against the elements.

In the top rod application of FIGS. 8 and 9, the adjuster 10 forms a part of the connecting rod 26A corresponding to rod 26 of FIG. 1 and is connected between the pivotal connection 27 and a shortened connecting rod 26A. The trigger mechanism 110A for controlling the adjuster 10 of FIGS. 8 and 9 is in the form of a connecting rod 190A that extends between the adjuster member 212 and a clevis structure 330 (to which it is fixed in any suitable manner as its end 192A) that is pivotally connected to dead lever 60A, as by pin 186, which lever 60A is in turn connected to connecting rod 64A that extends to a truck braking arrangement of the general type shown in FIG. 1. The dead lever 60 in the top rod application shown is fulcrumed as at 332 to one end of the brake cylinder 16A and the center rod 12A is pivotally connected between the cylinder lever 20A and the dead lever 60A as by appropriate pivotal connections 334 and 336. Trigger rod 190A is operably associated with the adjuster thrust device 108 in the same manner as trigger rod 190 (as indicated by identical reference numerals).

The adjuster 10 in both the center rod and top rod applications operates in the manner described in said Pat. 3,177,985 to automatically provide slack take up and let out under the control of the respective control assemblies 110 and 110A.

The adjuster organization of parts that is illustrated provides an adjuster arrangement in which a 19 inch travel adjuster made in accordance with this invention will have a fully contracted length of 64¼ inches and a maximum extended length of 83¼ inches. The basic arrangement illustrated when adapted to provide 24 inches of travel (that is preferred for top rod applications) will have a fully contracted length of 71 inches and a maximum extended length of 95 inches.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:
1. In a brake adjuster adapted to form a part of a railroad car brake rigging as a force transmitting device, and including a rod member provided with a screw portion at one end thereof and means adjacent the other end thereof for securing same into the rigging, a housing member mounted in telescoping relation to the rod member screw portion at one end thereof and including means adjacent the other end thereof for securing same into the rigging, resilient means for biasing said members in a slack take up direction from an extended relation to a contracted relation in which said rod member is substantially withdrawn inside said housing member, a nut threadedly received on said screw portion of said rod member and within a portion of said housing, said housing member portion carrying a stop clutch assembly including spaced seats adapted to be engaged by opposing clutch surfaces of said nut, and means for actuating said nut during operation of the brake rigging to rotate in slack take up and let out directions as required to maintain the stroke of the rigging brake cylinder of substantially uniform length including slack take up controlling means comprising an actuator including overtravel spring means, thrust pin means interposed between said overtravel spring means and said nut, a member mounted on said housing member for shifting movement longitudinally thereof, and means for shifting said shiftably mounted member against said overtravel spring means in response to brake cylinder overtravel to bias said thrust pin means against said nut to bias same to rotate in a slack take up direction, the improvement wherein:

said overtravel spring means comprises:
a first cannister member received over said housing member and interposed between said shiftably mounted member and said thrust pin means,
a compression spring housed in said cannister member,
said shiftably mounted member operatively engaging said compression spring for compressing same against said thrust pin means on said movement in response to brake cylinder overtravel,
and a second cannister received over said first cannister and made fast to said housing member,
said shiftably mounted member extending into said second cannister member for said operative engagement with said compression spring.

2. The improvement set forth in claim 1 including:
seal means interposed between said second cannister member and said shiftably mounted member,
and seal means interposed between said shiftably mounted member and said housing member.

3. The improvement set forth in claim 1 wherein:
said housing member includes stop means positioned to limit movement of said shiftably mounted member in a direction away from said overtravel spring means to a predetermined amount.

4. The improvement set forth in claim 1 wherein:
said first cannister member comprises a cylinder having end walls between which said compression spring is interposed,
one of said end walls being removably mounted and engaging said thrust pin means,
and a spring seat interposed between the other cylinder end wall and said compression spring,
said cylinder other end wall being formed to receive said shiftably mounted member.

5. The improvement set forth in claim 4 wherein:
said second cannister member comprises a sleeve member,
said sleeve member being proportioned to overlie said first cannister member throughout the length of the latter and having one end thereof secured in sealing relation to said housing member adjacent said portion thereof and about said thrust pin means,
said sleeve member at the other end thereof including an end wall proportioned to receive said shiftably mounted member,
and seal means interposed between said sleeve member other end and said shiftably mounted member in sealing relation therebetween.

6. The improvement set forth in claim 5 including:
seal means interposed between said shiftably mounted member and said housing member in sealing relation therebetween,
whereby said overtravel spring means is sealed from the atmosphere.

7. The improvement set forth in claim 6 including:
seal means interposed between said housing member and said rod member adjacent said one end thereof in sealing relation therebetween.

8. The improvement set forth in claim 1 wherein:

said resilient means comprises a pair of compression springs received in said housing member in concentric relation and operatively interposed between said housing member and said rod member for biasing said rod and housing members in said slack take up direction,
said compression springs being of opposite turn.

9. In a brake adjuster adapted to form a part of a railroad car brake rigging as a force transmitting device, and including a rod member provided with a screw portion at one end thereof and means adjacent the other end thereof for securing same into the rigging, a housing member mounted in telescoping relation to the rod member screw portion at one end thereof and including clevis means adjacent the other end thereof for securing same into the rigging, resilient means for biasing said members in a slack take up direction from an extended relation to a contracted relation in which said rod member is substantially withdrawn inside said housing member, a nut threadedly received on said screw portion of said rod member and within a portion of said housing, said housing member portion carrying a stop clutch assembly including spaced seats adapted to be engaged by opposing clutch surfaces of said nut, and means for actuating said nut during operation of the brake rigging to rotate in slack take up and let out directions as required to maintain the stroke of the rigging brake cylinder of substantially uniform length including slack take up controlling means comprising an actuator including overtravel spring means, thrust pin means interposed between said overtravel spring means and said nut, a member mounted on said housing member for shifting movement longitudinally thereof, and means for shifting said shiftably mounted member against said overtravel spring means in response to brake cylinder over travel to bias said thrust pin means against said nut to bias same to rotate in a slack take up direction, said portion of said housing member extending from said one end thereof to said thrust pin means, said housing member including a second portion extending between said thrust pin means and said other end thereof and being of a transverse dimension that is less than the first mentioned housing portion, said thrust pin means extending through a transverse wall of said housing member and being disposed within said first mentioned portion of said housing member and about the exterior of said second housing member portion in parallel relation to both said housing member portions, the improvement wherein:

said overtravel spring means comprises:
a first cannister member received over said housing second portion member and interposed between said shiftably mounted member and said thrust pin means,
a compression spring housed in said cannister member,
said shiftably mounted member operatively engaging said compression spring for compressing same against said thrust pin means on said movement in response to brake cylinder overtravel,
and a second cannister received over said first cannister and made fast to said housing member,
said shiftably mounted member extending into said second cannister member for said operative engagement with said compression spring,
said second cannister member comprises a sleeve member,
said sleeve member being proportioned to overlie said first cannister member throughout the length of the latter and having one end thereof secured in sealing relation to said housing member adjacent said first portion thereof and about said thrust pin means,
said sleeve member at the other end thereof including an end wall proportioned to receive said shiftably mounted member,
seal means interposed between said sleeve member other end and said shiftably mounted member in sealing relation therebetween,
seal means interposed between said shiftably mounted member and said housing member in sealing relation therebetween, whereby said overtravel spring means is sealed from the atmosphere, and seal means interposed between said housing member and said rod member adjacent said one end thereof in sealing relation therebetween, whereby said nut, said thrust pin means and said resilient means are sealed from the atmosphere.

10. The improvement set forth in claim 9 wherein:

said housing member second portion is tubular and receives said one end of said rod member in said contracted relation of said members, said housing member second portion being externally threaded at said other end of said housing member and threadedly received in a threaded bore formed in said clevis means, whereby said clevis means forms the contracted position limiting stop for said rod and housing member.

11. The improvement set forth in claim 10 wherein: said rod member at said other end thereof is equipped with a removable rod for making a welded connection to rod means for securing said rod member into the rigging.

12. The improvement set forth in claim 11 wherein said adjuster is mounted in the rigging in center rod application.

13. The improvement set forth in claim 11 wherein said adjuster is mounted in the rigging in top rod application.

References Cited

UNITED STATES PATENTS

| | | | |
|---|---|---|---|
| 3,177,985 | 4/1965 | Rauglas | 188—202 |
| 3,404,759 | 10/1968 | Natschke et al. | 188—202 |

DUANE A. REGER, Primary Examiner

U.S. Cl. X.R.

188—196